United States Patent
Hsiong et al.

(10) Patent No.: US 11,734,095 B2
(45) Date of Patent: Aug. 22, 2023

(54) SYSTEM AND METHOD FOR HANDLING ERRORS IN A VEHICLE NEURAL NETWORK PROCESSOR

(71) Applicant: Tesla, Inc., Austin, TX (US)

(72) Inventors: Christopher Hsiong, San Jose, CA (US); Emil Talpes, San Mateo, CA (US); Debjit Das Sarma, San Jose, CA (US); Peter Bannon, Woodside, CA (US); Kevin Hurd, Redwood City, CA (US); Benjamin Floering, San Jose, CA (US)

(73) Assignee: Tesla, Inc., Austin, TX (US)

(*) Notice: Subject to any disclaimer, the term of this patent is extended or adjusted under 35 U.S.C. 154(b) by 0 days.

(21) Appl. No.: 17/448,598

(22) Filed: Sep. 23, 2021

(65) Prior Publication Data

US 2022/0083412 A1    Mar. 17, 2022

Related U.S. Application Data

(63) Continuation of application No. 16/834,104, filed on Mar. 30, 2020, now Pat. No. 11,132,245, which is a
(Continued)

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0721* (2013.01); *G06F 11/0751* (2013.01);
(Continued)

(58) Field of Classification Search
CPC ............ G06F 11/327; G06F 11/3055; G06F 11/3006; G06F 11/1438; G06F 11/0793;
(Continued)

(56) References Cited

U.S. PATENT DOCUMENTS

| | | | |
|---|---|---|---|
| 5,919,267 A | 7/1999 | Breed | |
| 8,953,436 B2 * | 2/2015 | Diab | ............... H04L 69/40 370/217 |

(Continued)

FOREIGN PATENT DOCUMENTS

| | | |
|---|---|---|
| KR | 10-2006-0126580 | 12/2006 |
| KR | 10-1242407 | 3/2013 |

(Continued)

OTHER PUBLICATIONS

International Search Report and Written Opinion dated Jan. 29, 2019 in PCT/US18/61677.

*Primary Examiner* — Charles Ehne
(74) *Attorney, Agent, or Firm* — Knobbe, Martens, Olson & Bear, LLP

(57) ABSTRACT

A system for handling errors in a neural network includes a neural network processor for executing a neural network associated with use of a vehicle. The neural network processor includes an error detector configured to detect a data error associated with execution of the neural network and a neural network controller configured to receive a report of the data error from the error detector. In response to receiving the report, the neural network controller is further configured to signal that a pending result of the neural network is tainted without terminating execution of the neural network.

20 Claims, 5 Drawing Sheets

Related U.S. Application Data continuation of application No. 15/817,005, filed on Nov. 17, 2017, now Pat. No. 10,606,678.

(51) Int. Cl.
*G06N 3/02* (2006.01)
*G06F 11/32* (2006.01)
*G06F 11/30* (2006.01)

(52) U.S. Cl.
CPC ...... *G06F 11/3006* (2013.01); *G06F 11/3055* (2013.01); *G06F 11/327* (2013.01); *G06N 3/02* (2013.01)

(58) Field of Classification Search
CPC ............. G06F 11/0751; G06F 11/0739; G06F 11/0772
See application file for complete search history.

(56) References Cited

U.S. PATENT DOCUMENTS

| | | | |
|---|---|---|---|
| 9,015,093 | B1 | 4/2015 | Commons |
| 10,089,203 | B2 | 10/2018 | Mohan |
| 10,606,678 | B2 | 3/2020 | Hsiong et al. |
| 11,132,245 | B2 | 9/2021 | Hsiong et al. |
| 2007/0271014 | A1 | 11/2007 | Breed |
| 2008/0161989 | A1* | 7/2008 | Breed ................. B60N 2/0244 701/31.4 |
| 2010/0023203 | A1 | 1/2010 | Shibi |
| 2011/0238258 | A1 | 9/2011 | Singh |
| 2012/0030392 | A1 | 2/2012 | Norden et al. |
| 2016/0139977 | A1* | 5/2016 | Ashani ..................... G06N 3/08 714/26 |
| 2017/0300372 | A1 | 10/2017 | Andreopoulos et al. |

FOREIGN PATENT DOCUMENTS

| KR | 10-2015-0122783 | 11/2015 |
|---|---|---|
| KR | 10-2016-0033735 | 3/2016 |
| KR | 10-2016-0034939 | 3/2016 |
| KR | 101706367 B1 | 2/2017 |

* cited by examiner

SYSTEM AND METHOD FOR HANDLING ERRORS IN A VEHICLE NEURAL NETWORK PROCESSOR

CROSS-REFERENCE TO RELATED APPLICATIONS

This application claims priority to, and is a continuation of, U.S. patent application Ser. No. 16/834,104 titled "SYSTEM AND METHOD FOR HANDLING ERRORS IN A VEHICLE NEURAL NETWORK PROCESSOR" and filed on Mar. 30, 2020, which claims priority to, and is a continuation of, U.S. patent application Ser. No. 15/817,005 titled "SYSTEM AND METHOD FOR HANDLING ERRORS IN A VEHICLE NEURAL NETWORK PROCESSOR" and filed on Nov. 17, 2017. The disclosures of the above-recited applications are hereby incorporated herein by reference in their entirety.

TECHNICAL FIELD

The present disclosure is directed to systems and methods for handling errors occurring in vehicles and more particularly to systems and methods for handling errors in a vehicle neural network processor.

BACKGROUND

Many vehicles today come equipped with a wide range of features designed to improve safety and reliability. In part, this is because vehicle accidents and/or breakdowns are accompanied by a high risk of personal injury, death, and property damage. At the very least, an accident and/or breakdown is likely to involve significant inconvenience and/or cost to the vehicle owner. Accordingly, many efforts have been made to develop improved safety features for vehicles.

Increasingly, computers are being integrated into vehicles for purposes ranging from passenger comfort and entertainment to partial or full self-driving operation. While computers have the potential to address many safety and reliability issues in vehicles, they also introduce new risks and new modes of failure that have yet to be fully addressed. It is important that safeguards are put in place to ensure that computer-enabled and/or computer-assisted features of a vehicle do not increase the risk of operating the vehicle. Various strategies can be employed to test computer-implemented vehicle features before they are put into production. However, even when thorough testing is performed, errors are still likely to be encountered when operating under real-world conditions.

Accordingly, it would be advantageous to provide improved systems and methods for handling errors in processors used in vehicular applications.

SUMMARY

According to some embodiments, a system for handling errors in a neural network may include a neural network processor for executing a neural network associated with use of a vehicle. The neural network processor includes an error detector configured to detect a data error associated with execution of the neural network and a neural network controller configured to receive a report of the data error from the error detector. In response to receiving the report, the neural network controller is further configured to signal that a pending result of the neural network is tainted without terminating execution of the neural network.

According to some embodiments, a system may include a neural network processor for executing a neural network associated with autonomous operation of a vehicle and an interrupt controller coupled to the neural network processor. The interrupt controller is configured to receive an error signal via an error interrupt pin of the neural network processor, access error information via one or more status registers of the neural network processor, the error information indicating a type of error encountered by the neural network processor, and, when the type of the error corresponds to a data error, identify a pending result of the neural network processor as corrupt.

According to some embodiments, a method for handling errors in a neural network processor may include receiving an error report based on an error encountered by the vehicle neural network processor during operation of a vehicle, determining a type of the error based on the error report; and, in response to determining that the type of the error corresponds to a data error, signaling that a pending result of the vehicle neural network processor is corrupt while allowing operation of the vehicle neural network processor to proceed.

Summaries of embodiments are also provided by the claims that follow the description.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Figure 1:
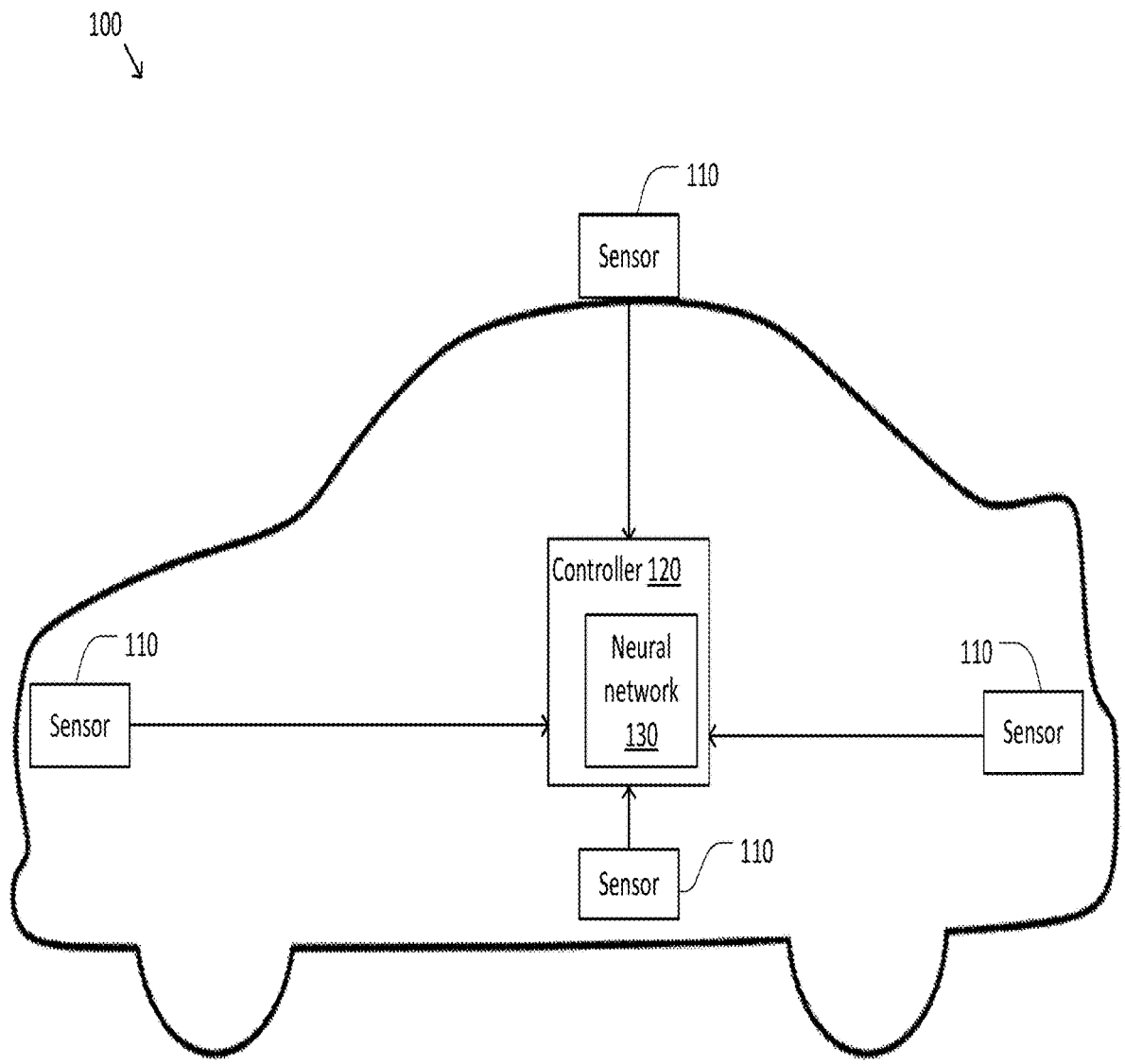
FIG. 1 is a simplified diagram of a vehicle with a neural network processing system according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances well known methods, procedures, components, and circuits have not been described in detail so as not to unnecessarily obscure aspects of the embodiments.

Neural networks use patterns extracted from large data sets to make predictions based on input data. The predictions can include classifying the input data (e.g., labeling objects in an image), making decisions based on the input data (e.g., steering an autonomous vehicle or selecting a move in a game), clustering the input data, and/or the like. In general, it is possible to run neural networks using general purpose computing hardware. However, the performance of a neural network can often be significantly improved using application-specific hardware. For example, computing a neural network may involve matrix operations that may be efficiently performed using single-input multiple-data (SIMD) processing techniques with an application-specific hardware implementation.

While designing and using an application-specific neural network processor may offer performance advantages, the application-specific hardware may encounter errors that are unique to the neural network processor and/or occur more frequently in the neural network processor than in general purpose processors. Moreover, the process of developing and testing the application-specific hardware may be more time-consuming and/or costly than an off-the-shelf solution. Accordingly, it is desirable to provide improved systems and methods for processing neural networks and for handling errors encountered during bring-up and production of a neural network processor, such as a vehicle neural network processor used in the operation of a vehicle.

FIG. 1 is a simplified diagram of a vehicle 100 with a neural network processing system according to some embodiments. According to some embodiments, vehicle 100 may correspond to a land vehicle such as a car, motorcycle, or truck, an air vehicle such as an airplane, spacecraft, drone, or satellite, a water vehicle such as a boat or submarine, and/or the like. In some examples, vehicle 100 may be a fully electric vehicle, a hybrid electric vehicle, a gasoline-powered vehicle, and/or the like.

In some examples, vehicle 100 may be fully or partially self-driving. Consistent with such embodiments, vehicle 100 may be equipped with one or more sensors 110 that collect data associated with vehicle 100 and/or its surroundings. The sensor data may include image data, audio data, time-series data, and/or the like. Illustrative examples of sensors 110 include cameras (including visible light cameras, infrared cameras, and/or the like), microphones, temperature sensors, LIDAR units, accelerometers, tachometers, and/or the like.

In some embodiments, vehicle 100 may include a controller 120 to perform real-time decision-making tasks associated with autonomously driving vehicle 100. For example, the autonomous driving tasks may include identifying or classifying objects in the vicinity of vehicle 100, controlling the steering, transmission, acceleration, and/or braking of vehicle 100, providing alerts to a driver of vehicle 100, transmitting driving data to a remote server, and/or the like.

In some examples, controller 120 may control operation and/or execution of hardware and/or software. In some examples, controller 120 may include one or more processors, CPUs, multi-core processors, field programmable gate arrays (FPGAs), application specific integrated circuits (ASICs), and/or the like. In some examples, controller 120 may further include memory, which may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM (e.g., DRAM, SRAM, etc.), PROM, EPROM, FLASH-EPROM, any other memory chip or cartridge, and/or any other medium from which a processor or computer is adapted to read. In some examples, controller 120 may include multiple chips in multiple packages, multiple chips in a single package (e.g., system-in-package (SIP)), and/or a single chip (e.g., system-on-chip (SOC)).

During driving operation, controller 120 may receive streams of real-time input data from sensors 110. In some examples, controller 120 may process the input data from sensors 110 using a neural network. For example, the neural network may include a series of layers, where each layer operates on the output of one or more previous layers. The layers are configured using weights and/or biases that are "learned" based on training data using machine learning techniques. Examples of layers include convolutional layers, densely connected layers, recurrent layers, activation layers, pooling layers, and/or the like. In some examples, the neural network may be defined using one or more model definition files that describe the structure of the neural network, one or more parameter files that include pretrained weights and/or biases of the neural network, and/or the like.

In an illustrative example, the neural network may be an image recognition network that is trained to label objects that appear in an image. For example, the input data to the neural network may correspond to an image (or a batch of images) captured by a camera of vehicle 100. Consistent with this example, one or more first layers of the neural network may be implemented as convolutional layers, and one or more last layers of the neural network model may be implemented as densely connected layers. The convolutional layers apply pretrained filters that determine whether certain features appear in the image. For example, the pretrained filters may correspond to particular shapes, colors, heat signatures, movement, sizes of sub-images, and/or patterns in the image, as well as the size and/or global parameters of the image. The densely connected layers then map the set of features appearing in the image to labeled objects (e.g., "pedestrian," "tree," "lane marker," "stop sign," etc.).

In many cases, processing neural networks is data and/or computationally intensive. For example, a deep convolutional neural network used for image recognition may include millions or billions of parameters. Correspondingly, a forward pass through the neural network may involve millions or billions of computations. Accordingly, it may be desirable to process the neural network using dedicated computational resources (e.g., hardware and/or software resources) so as to improve the performance of the neural network and/or reduce interference between the execution of the neural network and other applications of controller 110. In some embodiments, controller 120 may process the neural network using a neural network processor 130, which may include one or more processor cores that are substantially dedicated to processing neural networks. For example, neural network processor 130 may be implemented using application specific integrated circuits (ASIC) and/or a field-programmable gate array (FPGA) to achieve hardware-accelerated performance when executing the neural networks.

In some examples, neural network processor 130 may process multiple neural networks in series and/or in parallel. For example, neural network processor 130 may process a first image recognition model that receives a stream of input data from a front-facing camera, a second image recognition model that receives a stream of input data from a rear-facing camera, an audio recognition model that receives audio data from a microphone, and/or the like. Consistent with such examples, neural network processor 130 may sequentially process each model as new frames of image and/or audio data are received. In other examples, multiple neural networks may be processed in parallel using multiple neural network processors and/or processor cores.

Although controller 120 and neural network processor 130 are depicted as being integrated into vehicle 100 for illustrative purposes, it is to be understood that controller 120 and/or neural network processor 130 may be located on-board and/or off-board vehicle 100. For example, vehicle 100 may transmit input sensor data to neural network processor 130 in a remote location via a network. Moreover, neural network processor 130 may be used to process neural networks in a wide variety of contexts, including non-vehicular contexts. For example, neural network processor 130 may be used for applications such as general purpose computing, mobile computing, server-based applications, embedded applications, industrial manufacturing, and/or the like.

In autonomous driving applications, as well as in other applications, one objective of neural network processor 130 is to operate continuously and reliably. For example, neural network processor 130 may have a limited amount of time to operate on the input data before the input data becomes stale (i.e., the input data is no longer representative of the current state and/or surroundings of vehicle 100). In some circumstances, this may occur within a few hundredths of a second, as in the case of a fast-moving vehicle. In this regard, loss of functionality, processing delays, and/or aberrant behavior of neural network processor 130 while vehicle 100 is in motion could cause an accident, resulting in property damage, injury, and/or death.

The effect of a particular error on neural network processor 130 may vary depending on the type of the error. Some types of errors may cause neural network processor 130 to hang or time out. That is, one or more portions of neural network processor 130 may freeze or otherwise remain inactive for more than a predetermined amount of time. When a timeout error is encountered, neural network processor 130 may cease to provide output data and/or respond to input data. Other types of errors, such as program errors and/or data errors, may cause the output data generated by neural network processor 130 to be corrupted. When such errors are encountered, neural network processor 130 may continue to provide output data, but the result may be incorrect, meaningless, and/or otherwise unusable.

To address safety concerns associated with such errors, neural network processor 130 may include safety features to prevent, detect, and/or respond to errors. The safety features may be implemented and/or activated at various stages of the design-cycle of neural network processor 130. For example, the design-cycle of neural network processor 130 may include a bring-up stage and a production stage. During bring-up, neural network processor 130 may undergo testing to verify that the functionality of neural network processor 130 is as expected. For example, bring-up may occur after neural network processor 130 has been designed and taped-out to a manufacturer, but before neural network processor 130 is put into production. Defects that are discovered during bring-up can then be safely addressed before neural network processor 130 is deployed in a production model of vehicle 100 or otherwise provided to end consumers. For example, during bring-up, neural network processor 130 may be placed in a standalone test environment and/or in a prototype model of vehicle 100.

In some examples, neural network processor 130 may have a high level of complexity and/or may include a number of sub-systems, each of which may be designed by different teams and/or vendors. In light of this complexity, the process of testing of neural network processor 130 during bring-up may be extensive (e.g., occurring over a period of weeks or months) and may have a substantial impact on the overall safety and reliability of neural network processor 130 and vehicle 100. For example, the testing may reveal undesirable and/or erroneous behavior that was not caught during the design of neural network processor 130. Consequently, as will be discussed in further detail below with reference to FIGS. 2-5, neural network processor 130 may include safety features that accelerate and/or improve the ability to detect, analyze, and/or debug defects during bring-up.

Even with extensive testing during bring-up, neural network processor 130 may still encounter errors during production (e.g., when deployed in a production model of vehicle 100). During production, unlike bring-up, it is generally desirable for neural network processor 130 to smoothly recover from an error with minimal disruption and/or downtime. In particular, neural network processor 130 may be responsible for performing real-time decision-making tasks associated with driving vehicle 100. Therefore, as will be discussed in further detail below with reference to FIGS. 2-5, neural network processor 130 may include safety features to efficiently move past errors and restore normal operation as quickly as possible during the production stage.

Figure 2:
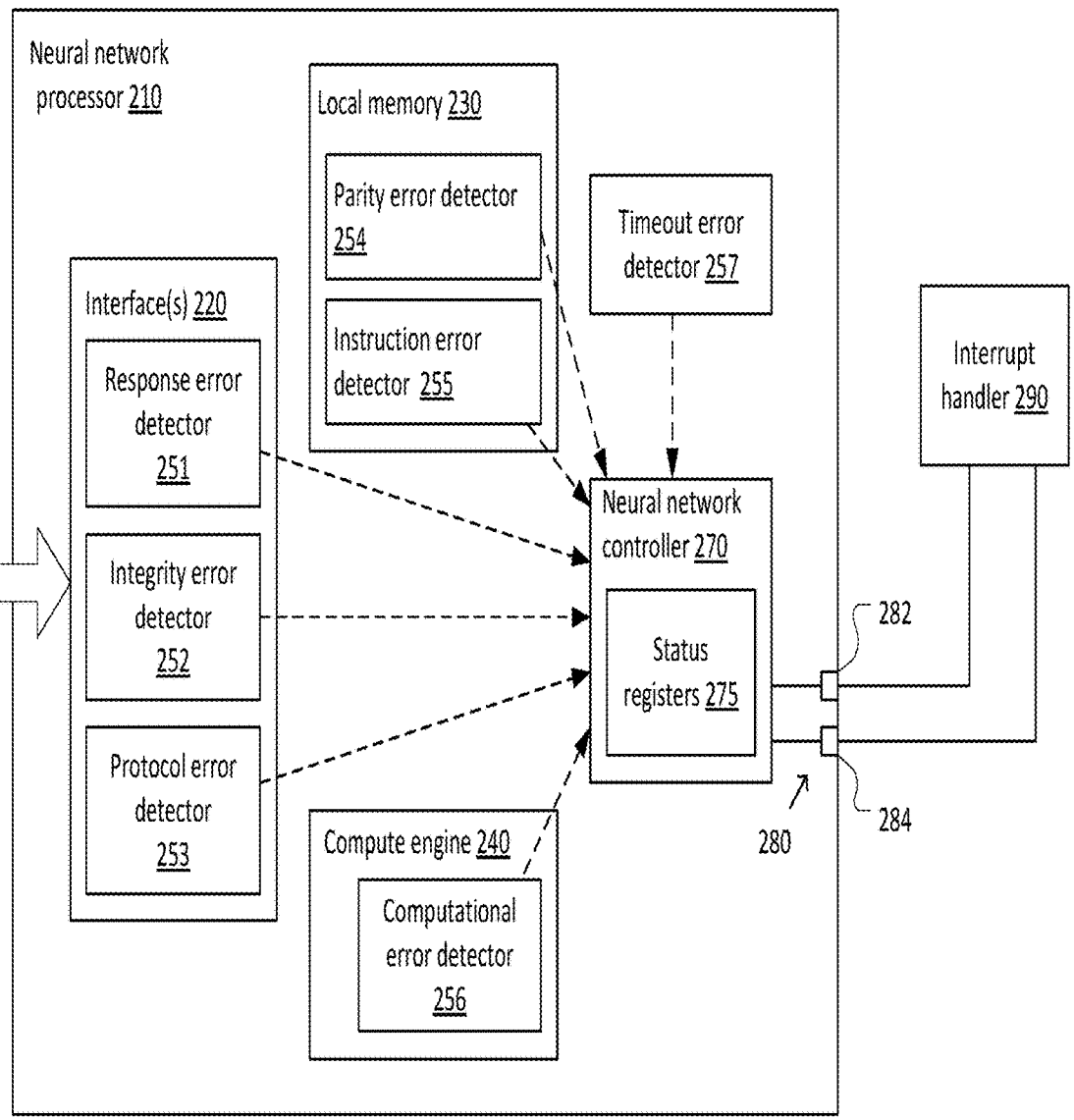
FIG. 2 is a simplified diagram of a system for processing a neural network according to some embodiments.

FIG. 2 is a simplified diagram of a system 200 for processing a neural network according to some embodiments. According to some embodiments consistent with FIG. 1, system 200 may include a neural network processor 210, which generally corresponds to neural network processor 130 of controller 120.

In some examples, neural network processor 210 may include an external interface 220 for receiving and/or transmitting data from or to one or more external resources (e.g., other processing and/or memory resources of controller 110). Among other functions, external interface 220 may be used to receive instructions from a CPU, to read the model definitions and/or parameters weights and/or biases) from memory, to access sensor data, to write out results of the neural network, and/or the like. In some embodiments, external interface 220 may include a direct memory access (DMA) controller.

In some embodiments, external interface 220 may implement one or more communication protocols. For example, external interface 220 may interface with a CPU (and/or other processors) of controller 110 using a non-coherent bus protocol, such as the advanced extensible interface (AXI) protocol. In another example, external interface 220 may interface with DRAM (and/or other memory) of controller 110 using a coherent bus protocol, such as the AXI coherency extensions (ACE) protocol. It is to be understood that these are merely examples, and that external interface module 220 may implement a wide variety of communication protocols in addition to and/or as an alternative to AXI and ACE.

In some examples, neural network processor 210 may include a local memory 230 that provides local data storage for neural network processor 210. For example, local memory 230 may store data associated with the neural network, such as the model definition; the model parameters (e.g., weights and/or biases); input data for the neural network; intermediate results generated by neural network processor 210 (e.g., the output of a hidden layer of the neural network); final results of the neural network; and/or the like. In some embodiments, local memory 230 may store instructions and/or programs to be executed by neural network processor 210. In some embodiments, local memory 230 may be implemented using static RAM (SRAM).

In some examples, neural network processor 210 may include a compute engine 240. Compute engine 240 executes instructions to compute the result of the neural network for a given set of input data. In some embodiments, compute engine 240 may be optimized for neural network computations. For example, compute engine 240 may include a single-instruction multiple-data processor, a vector processor, and/or the like. In some examples, the instructions executed by compute engine 240 may be floating point instructions.

During operation, neural network processor 210 and/or its constituent modules (e.g., external interface 220, local memory 230, and/or compute engine 240) may encounter errors that may disrupt the functionality of neural network processor 210, cause the results of neural network processor 210 to become corrupted or tainted, and/or the like. Accordingly, neural network processor 210 may include one or more error detectors 251-257 to monitor the operation of neural network processor 210 and detect the occurrence of errors. In response to detecting an error, error detectors 251-257 may report the detected error such that an appropriate remedial action may be taken.

In some embodiments, error detectors 251-257 may include a response error detector 251 associated with external interface 220. In some embodiments, response error detector 251 may report a response error based on status information extracted from response messages received via external interface 220. For example, when external interface 220 issues read and/or write request, external interface 220 may receive a response packet that includes one or more status bits to signify whether an error was encountered during fulfillment of the request. In some examples, the status bits may be defined in an applicable protocol, such as the ACE protocol. For example, the status bits may include an n-bit status code, such as a two-bit code where 00 indicates no error, 01 indicates a slave error, 10 indicates a decode error, and 11 is undefined. Accordingly, response error detector 251 may determine whether the status code of a response packet indicates an error (e.g., any status code other than 00).

In some embodiments, error detectors 251-257 may include an integrity error detector 252 associated with external interface 220. In some embodiments, integrity error detector 252 may verify the integrity of data received via external interface 220 and report an integrity error when the received data is corrupted. For example, the received data may include an error detection code, such as a cyclic redundancy check (CRC). Consistent with such examples, integrity error detector 252 may verify that the error detection code matches the received data. The use of an error detection code may be particularly beneficial when requesting data that persists in memory for a long period of time. For example, the model definition and/or the model parameters of a neural network may be stored in memory for a period of minutes or hours while operating vehicle 100 and are therefore prone to stochastic errors (e.g., hit flips caused by thermal fluctuations). In such cases, the verification of an error detection code by integrity error detector 252 may allow for efficient detection of corrupted data. Conversely, real-time sensor data is generally stored in memory for a short period of time (e.g., less than one second), making the data less prone to stochastic errors, and therefore may not include an error detection code.

In some embodiments, error detectors 251-257 may include a protocol error detector 253 associated with external interface 220. In some embodiments, protocol error detector 253 may report a protocol error when an error associated with a communication protocol implemented by external interface 220 is detected. For example, protocol error detector 253 may detect illegal read and/or write transactions associated with the AXI protocol (e.g., illegal burst types, cacheline crossing without wrapping burst type, etc.) when receiving instructions from the CPU.

In some embodiments, error detectors 251-257 may include a parity error detector 254 associated with local memory 230. In some embodiments, parity error detector 254 may verify the integrity of the data stored in local memory 230 and raise a parity error when the stored data is identified as being corrupted. In some examples, parity check module 242 may maintain one or more parity bits and report the parity error when the parity bits do not match the stored data.

In some embodiments, error detectors 251-257 may include an instruction error detector 255 associated with local memory 230. In some embodiments, instruction error detector 255 may validate instructions stored in local memory 230 and raise an instruction error when the stored instructions are invalid. For example, instruction error detector 255 may raise an instruction error when an unrecognized instruction is detected (e.g., an instruction with an instruction code that does not correspond to an operation that neural network processor 210 is configured to perform). In some embodiments, instruction error detector 255 may validate the instructions at various times during operation, e.g., while the instructions are being written to local memory 230 (e.g., as they are received via a programming interface of external interface 220, prior to execution of the neural network), while the instructions are being retrieved from local memory 230 (e.g., as they are executed by compute engine 240), and/or at any other suitable time.

In some embodiments, error detectors 251-257 may include a computational error detector 256 associated with compute engine 240. In some embodiments, computational error detector 256 may report errors associated with performing computations via compute engine 240. Illustrative errors that may be encountered by compute engine 240 during operation may include invalid operations, division by zero, overflow, underflow, denormalization, inexact numbers, and/or the like. In some examples, one or more of the errors may correspond to floating point exceptions defined by the IEEE 754 standard.

In some embodiments, error detectors 251-257 may include a timeout error detector 257. In some embodiments, timeout error detector 257 may report a timeout error when one or more modules and/or tasks performed by neural network processor 210 hang or otherwise become unresponsive. For example, timeout error detector 257 may monitor certain types of activity in neural network processor 210, such as receiving and/or sending data via external interface 220. After a period of inactivity, timeout error detector 257 may determine that one or more modules and/or tasks performed by neural network processor 210 is hanging and flag the error. In some examples, timeout error detector 257 may be implemented using a watchdog timer (WDT). An exemplary embodiment of timeout error detector 257 is discussed in further detail in FIG. 3.

It is to be understood that error detectors 251-257 depicted in FIG. 2 are merely examples, and that neural network processor 210 may include many other types of error detectors. Moreover, although error detectors 251-257 are depicted as being associated with and/or embedded within particular modules of neural network processor 210 (e.g., external interface 220, local memory 230, and/or compute engine 240), error detectors 251-257 may be arranged in various additional and/or alternative configurations. For example, instruction error detector 255 may be incorporated into external interface 220 and/or compute engine 240 in addition to and/or instead of local memory 230.

In some embodiments, neural network processor 210 may include a neural network controller 270. In some embodiments, neural network controller 270 may maintain state information associated with each of the one or more neural networks running on neural network processor 210. For example, neural network controller 270 may maintain one or more status registers 275 for each neural network. In some examples, status registers 275 may keep track of the execution state of each neural network using variables such as a progress indicator (e.g., pending, running, completed, etc.), an error indicator, an address pointer (e.g., a location in memory where the current result of a neural network is stored), and/or the like.

In some examples, neural network controller 270 may set the level of one or more interrupt pins 280 for each neural network. Interrupt pins 280 are coupled to an interrupt handler 290 to enable system 200 to respond to the interrupt signals. For example, interrupt pins 280 may include a completion pin 282 that is used to signal when a neural network has finished a computation and/or the results of the neural network have been updated in output buffer 226. In some examples, completion pin 282 may be operated as an edge-sensitive and/or level-sensitive interrupt. In response to detecting an interrupt signal on completion pin 282, system 200 may retrieve the updated results of the corresponding neural network.

In some embodiments, neural network controller 270 may centrally manage and/or respond to the errors reported by error detectors 251-257. For example, errors may be reported to neural network controller 270 using machine check architecture (MCA) reporting. Consistent with such embodiments, status registers 275 may store error codes for each neural network, such as 16-bit MCA error codes. In some examples, the error codes may indicate whether an error occurred in the respective neural networks (e.g., using an error valid bit), and if so, the type of error encountered (e.g., response error, integrity error, etc.). Likewise, interrupt pins 280 may include an error pin 284 that is used to signal when the neural network encounters an error. In some examples, error pin 284 may be operated as an edge-sensitive and/or level-sensitive interrupt. In response to detecting an interrupt signal on error pin 284, system 200 may determine the type of the error by accessing the error code via status register 275 and take an appropriate remedial action based on the error type.

In some embodiments, completion pin 282 and error pin 284 may be operated asynchronously. That is, an error interrupt signal may be transmitted on error pin 284 without waiting for a corresponding completion interrupt signal to be transmitted on completion pin 282. Consequently, interrupt handler 290 has the option of responding immediately to the error interrupt handler (e.g., by terminating the neural network) or waiting for the pending computation to complete despite the error. In some embodiments, the decision of whether to immediately terminate the neural network or wait for completion may depend on the type of error.

As discussed above, neural network processor 210 may identify and flag a number of types of errors that occur during the processing of a neural network. In some examples, the errors may generally be categorized as program errors (e.g., protocol errors and/or instruction errors detected by error detector 253 and/or 255, respectively), data errors (e.g., response errors, integrity errors, parity errors, and/or computational errors detected by error detectors 251, 252, 254, and 256, respectively), and/or timeout errors (e.g., timeout errors detected by timeout error detector 257).

For some types of errors, execution of the neural network may be terminated immediately upon error detection. For example, when a program error (e.g., a protocol error and/or instruction error) is encountered, the neural network may be restarted immediately upon detection of the error in order to reload the program. In another example, when a timeout error is encountered, neural network processor 210 may be rebooted immediately upon detection of the error in order to unfreeze any modules that are hanging.

For other types of errors, the next result of the neural network computation may be deemed tainted or corrupted, but the pending computation may still be allowed to proceed. For example, when a data error (e.g., a response error, integrity error, parity error, and/or computational error) is encountered, the pending computation that is based on the erroneous data may be allowed to proceed without terminating execution of the neural network and/or rebooting neural network processor 210. However, system 200 may be instructed to ignore or skip the result of the computation. Skipping tainted results generated by the neural network without restarting the neural network serves the dual purpose of avoiding misplaced reliance on tainted data while also avoiding the disruption associated with restarting the neural network entirely. For example, in self-driving vehicle applications, the neural network may process tens or hundreds of image frames per second. In this context, skipping frames on occasion may not be regarded as problematic and/or may not have a significant impact on self-driving performance. At the same time, this approach avoids the risk associated with relying on erroneous data because tainted results are identified as such and thrown out.

In some embodiments, the response to certain type of errors may depend on the design-cycle stage of system 200. For example, during the bring-up stage, when a timeout error is encountered, neural network processor 210 may transition to a debug mode. As discussed in greater detail below with reference to FIG. 4, in the debug mode, the execution of the neural network processor may be paused, allowing access to detailed state information (e.g., register states) of neural network processor 210 and/or allowing single-step execution of instructions. Entering the debug mode may facilitate rapid and/or accurate identification of the cause of the timeout error by providing access to the state of neural network processor 210 at the time that the error occurred. On the other hand, entering the debug mode may be unsuitable for the production stage; the preferred behavior in response to a timeout error in the production stage may be to attempt to restore normal operation of neural network processor 210 as quickly as possible. Accordingly, during the production stage, when a timeout error is encountered, the neural network may be terminated and/or neural network processor 210 may be rebooted immediately.

Although a single set of status registers 275 and interrupt pins 280 are shown for simplicity, it is to be understood that neural network processor 210 may include multiple sets of status registers and interrupt pins. In particular, the number of sets of status registers and interrupt pins may correspond to the number of neural networks that neural network processor 210 is configured to process serially and/or in parallel. In an illustrative embodiment, neural network processor 210 may include 32 sets of status registers and interrupt pins, such that neural network processor 210 is able to process up to 32 neural networks at a time.

Figure 3:
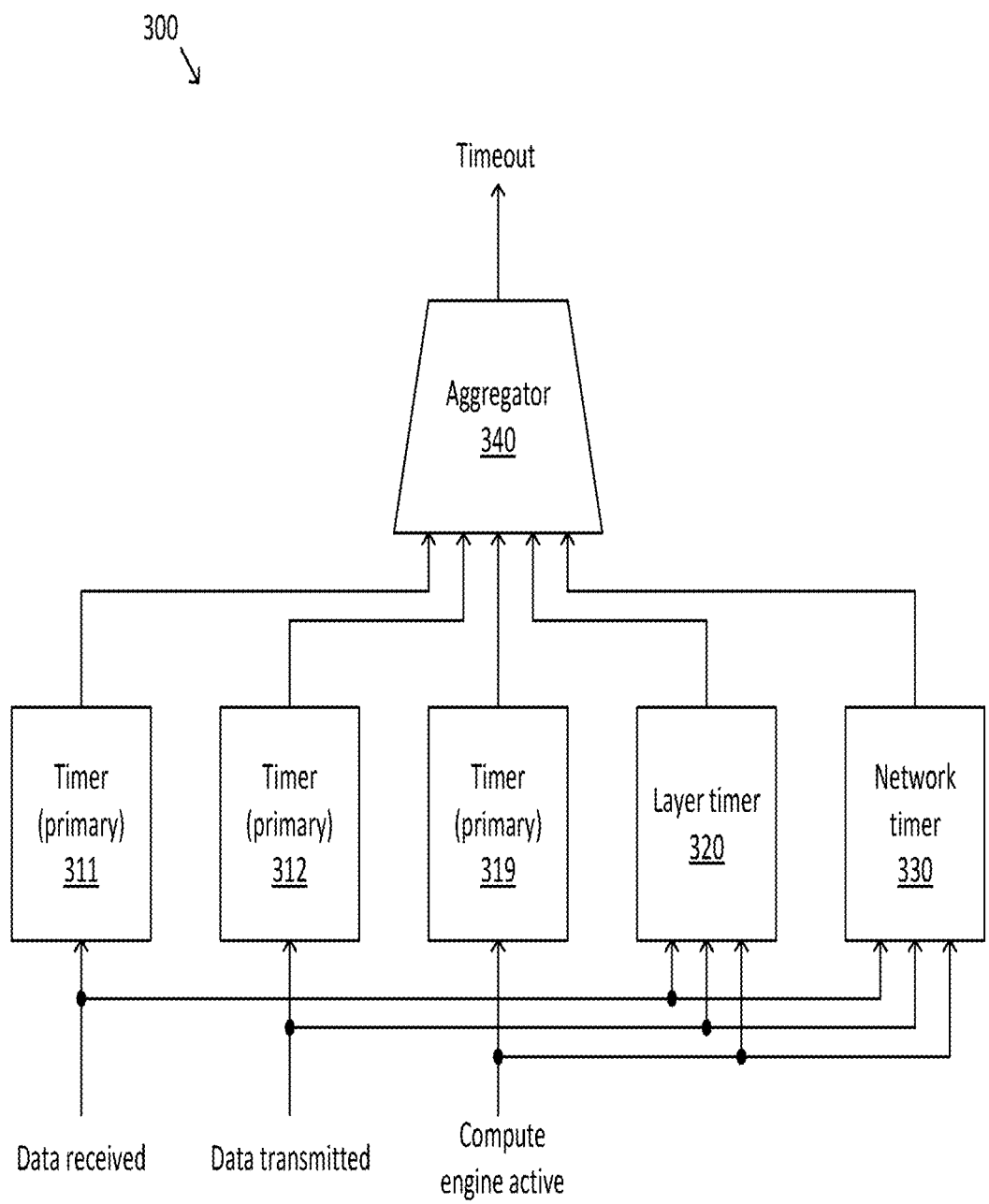
FIG. 3 is a simplified diagram of a timeout error detector according to some embodiments.

FIG. 3 is a simplified diagram of a timeout error detector 300 according to some embodiments. According to some embodiments consistent with FIGS. 1-2, timeout error detector 300 may be used to implement timeout error detector 257 of neural network processor 210.

As depicted in FIG. 3, timeout error detector 300 includes one or more primary timers 311-319. In some examples, primary timers 311-319 may monitor idle cycles in one or more blocks or modules of neural network processor 210. For example, primary timer 311 may monitor the elapsed time since external interface 220 has received data (e.g., read data from memory). In another example, primary timer 312 may monitor the elapsed time since external interface 220 has transmitted data (e.g., written data to memory). In a further example, primary tinier 319 may monitor the elapsed time since compute engine 240 has been active (e.g., executed instructions).

In some embodiments, the elapsed time may be determined by counting clock cycles since activity was last detected. For example, primary timers 311-319 may count down from a threshold number of clock cycles. In some examples, each of the blocks being monitored may issue a signal indicating the occurrence of an activity (e.g., a packet being read from and/or written to the memory, an instruction being executed by the compute engine, and/or the like). When a signal is received from the block being monitored, the count resets to the threshold value. If the count reaches zero, an error is raised. Additionally or alternately, primary timers 311-319 may count up from zero until the threshold number is reached.

In some embodiments, timeout detection module 300 may additionally include one or more composite timers, such as a layer timer 320 and/or a neural network timer 330. In some embodiments, the composite timers may monitor aggregate activity in a plurality of blocks of neural network processor 210. For example, the composite timers may concurrently monitor the elapsed time since external interface 200 has received data, the elapsed time since external interface 200 has transmitted data, and/or the elapsed time since compute engine 240 has been active.

In some examples, layer timer 320 may time out when the time taken to process a layer of the neural network has exceeded a predetermined amount of time. Consistent with such examples, layer timer 320 may monitor a sum of activities pertaining to executing a layer in a neural network, which may include, but is not limited to, memory read, memory write, and compute engine activity. In some examples, the threshold time for layer timer 320 may be greater than the threshold time for each of primary timers 311-319.

In some examples, neural network timer 330 may time out when the time taken to process the entire neural network has exceeded a predetermined amount of time. Consistent with such examples, neural network timer 330 may monitor a sum of activities pertaining to executing a neural network, which may include, but is not limited to, memory read, memory write, and compute engine activity. In some examples, the threshold time for neural network timer 330 may be greater than the threshold time for primary timers 311-319 and/or layer timer 320. For example, the threshold time for neural network timer 330 may be one billion clock cycles.

In some examples, an aggregator 340 may provide an aggregate timeout error signal based on the outputs of primary timers 311-319 and/or the composite timers (e.g., layout timer 320 and/or neural network timer 330). According to some embodiments, the aggregate timeout error signal may indicate an error when any of primary timers 311-319, layer timer 320, and/or neural network timer 330 time out. That is, timeout error detector 300 may report a timeout error when individual modules of neural network processor 210 hang (resulting in one or more of primary timers 311-319 timing out), when a layer of the neural network hangs (resulting in layer timer 320 timing out), and/or when the neural network hangs (resulting in network timer 330 timing out).

Figure 4:
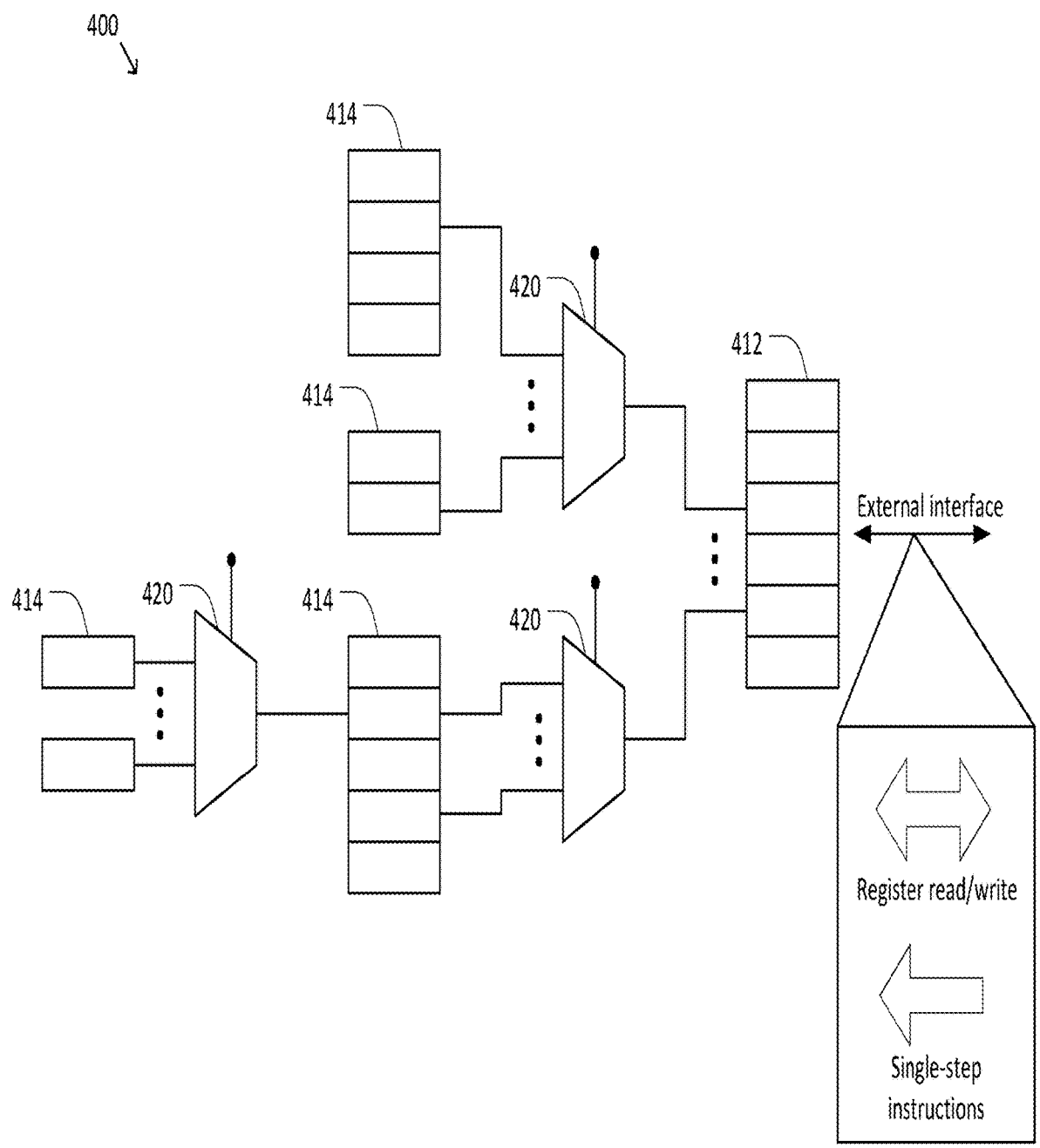
FIG. 4 is a simplified diagram of a neural network processor with a debug mode according to some embodiments.

FIG. 4 is a simplified diagram of a neural network processor 400 with a debug mode according to some embodiments. According to some embodiments consistent with FIGS. 1-3, neural network processor 400 may be used to implement neural network processor 210 of system 200. FIG. 4 illustrates the ability to access hidden registers of neural network processor 400 when debugging processor 400 during bring-up. In some examples, during bring-up, neural network processor 400 may transition from an operating mode (e.g., normal execution of neural networks) to the debug mode automatically in response to an error, such as a timeout error.

Neural network processor 400 includes a plurality of registers that store state information and/or various other types information (e.g., instructions, data, address pointers, etc.) associated with neural network processor 400. In some examples, the plurality of registers may include one or more top level registers 412 that may be easily and/or directly accessed via an external interface (e.g., via external interface 220 using the AXI bus protocol) for debugging purposes. Moreover, the plurality of registers includes one or more deep registers 414 that are not easily and/or directly accessed by external means. For example, the data stored in deep registers 414 may be accessed by migrating the data into top level registers 412 via multiplexers 420. Accordingly, the data stored in deep registers 414 may take a substantial amount of time to retrieve.

Conventionally, when a processor encounters an error, such as a timeout error, the running processes of the processor are terminated and/or rebooted without providing access to the state information stored in the processor's registers. Alternately, a snapshot may be saved that captures a subset of the processor's state information at the moment of the timeout error. For example, the snapshot may include data from one or more top level registers, such as top level registers 412. However, the snapshot generally does not include data from deep registers, such as deep registers 414. In particular, generating a comprehensive snapshot of the deep registers is likely to take a long time and be inefficient, as much of the information stored in the deep registers would be irrelevant to the error at hand. Nevertheless, the ability to selectively access relevant data from the deep registers would be desirable to accelerate the process of debugging the processor.

To address these issues, the execution of neural networks by neural network processor 400 is paused in the debug mode, such that the data in many registers of neural network processor 400 no longer changes values as in the operating mode. In some embodiments, neural network processor 400 otherwise remains capable of responding to external stimuli and/or requests in the debug mode. Consequently, the engineer tasked with debugging the error retains access to data from the registers, including top level registers 412 and deep registers 414. For example, the engineer can control multiplexers 420 to manually find information relevant to the error stored in deep registers 414. Moreover, as depicted in FIG. 4, the engineer may have the ability to run single-step instructions on neural network processor 400 to determine how incremental operations impact the state of neural network processor 400. These capabilities may assist the engineer in determining the root cause of the error. Accordingly, the process of debugging neural network processor 400 may be substantially accelerated relative to conventional approaches.

Figure 5:
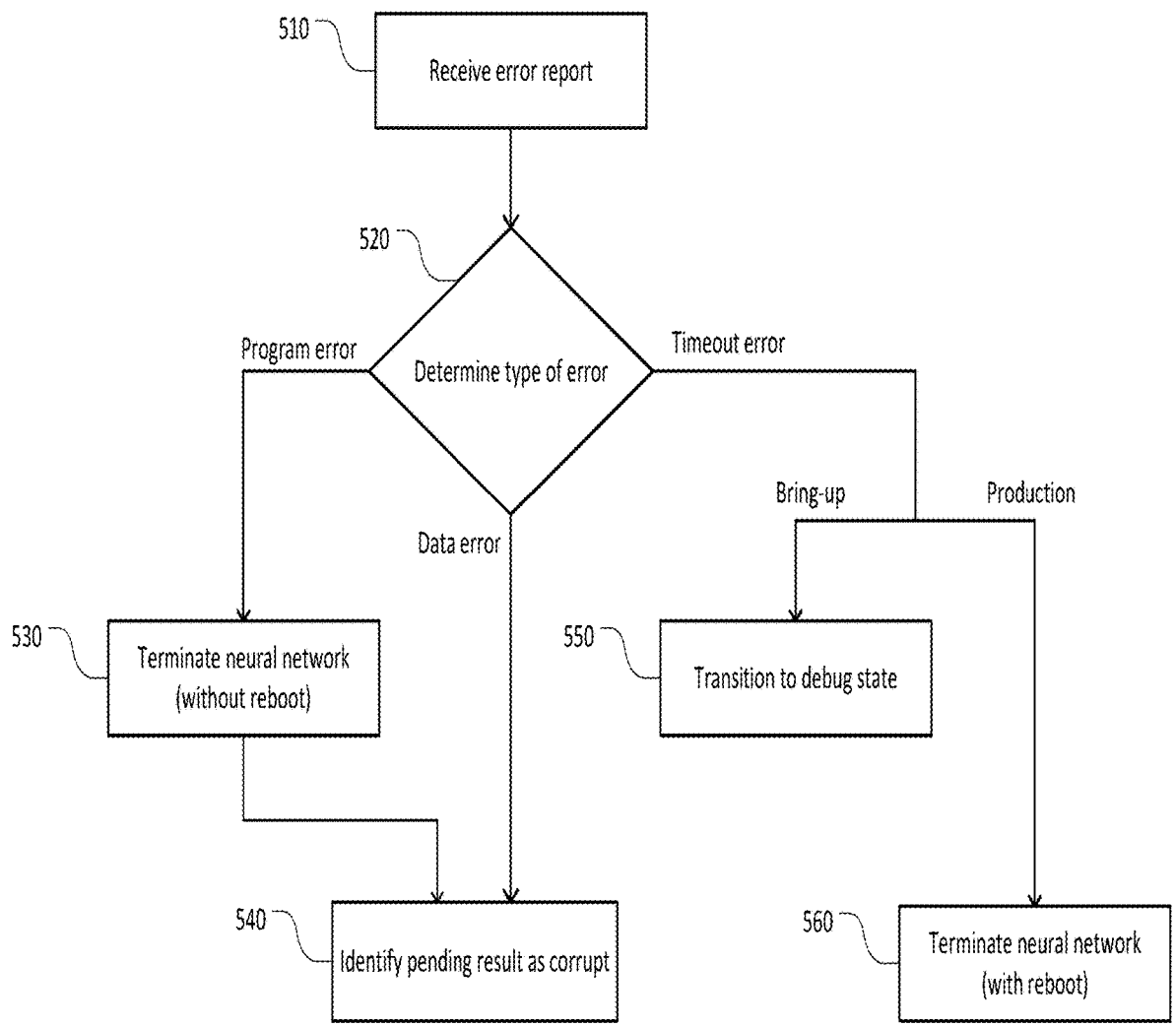
FIG. 5 is a simplified diagram of a method for error handling in a neural network processor according to some embodiments.

FIG. 5 is a simplified diagram of a method 500 for error handling in a neural network processor according to some embodiments. According to some embodiments consistent with FIGS. 1-4, method 500 may be implemented by neural network processors 120, 220, and/or 400.

At a process 510, an error report is received. For example, the error report may be received from one or more error detectors of the neural network processors, such as error detectors 251-257, in response to detecting an error. Illustrative examples of error reports include response errors, integrity errors, protocol errors, parity errors, instruction errors, computation errors, and/or timeout errors, as discussed previously with respect to FIG. 2. In some examples, the error report may correspond to a machine check architecture (MCA) error report.

At a process 520, a type of the error is determined. In some embodiments, determining the type of the error may include determining whether the error corresponds to a program error, a data error, and/or a timeout error. For example, program errors may include protocol errors and/or instruction errors; data errors may include response errors, integrity errors, parity errors, and/or computation errors; and timeout errors may include errors raised by timeout error detector 257. When a program error is encountered, method 500 may proceed to processes 530 and 540 for terminating execution of the neural network and identifying a pending result of the neural network as corrupt, respectively. When a data error is encountered, method 500 may proceed to process 540 for identifying a pending result of the neural network as corrupt without terminating execution of the neural network at process 530. When a timeout error is encountered, method 500 may proceed to either a process 550 for transitioning to a debug state or a process 560 for terminating execution of the neural network and resetting the neural network processor, depending on whether the neural network processor is operating in a bring-up mode or a production mode.

At a process 530, execution of the neural network is terminated and/or paused immediately, without resetting the neural network processor. In some embodiments, process 530 may be performed when a program error is encountered because the neural network processor may not be able to continue executing the neural network when the instructions to be executed are defective (e.g., when the program instructions include unrecognized or otherwise invalid commands and/or instruction codes). Accordingly, the execution of the neural network may be immediately halted such that the instructions may be reloaded and/or otherwise corrected.

At a process 540, a pending result of the neural network is identified as being corrupt. In some embodiments, the pending result may be identified as corrupt by changing the level of an error interrupt pin of the neural network processor, such as error interrupt pin 284. Changing the level of the error interrupt pin may cause an external system, such as interrupt handler 290, to access error information (e.g., by retrieving error information from the status registers of the neural network processor) and determine an appropriate remedial action. Examples of remedial actions that may be taken in response to the pending result of the neural network being identified as corrupt may include retrying the pending neural network computation from scratch and/or from a previous checkpoint; dropping the pending results entirely and moving on to the next computation; rebooting the neural network processor; and/or the like.

At a process 550, when the neural network processor encounters a timeout error during bring-up, the neural network processor transitions to a debug mode. As described previously with respect to FIG. 4, when the neural network processor transitions to the debug mode, the execution of the neural network processor is paused, such that the register values at the time of the timeout error stop changing. In this regard, an engineer may debug the timeout error by inspecting the register values and/or through single-step execution of instructions.

At a process 560, when the neural network processor encounters a timeout error in production, execution of the neural network is terminated and the neural network processor is rebooted. Unlike the bring-up case, it is desirable to get the neural network processor back up and running as quickly as possible in response to a timeout error. Moreover, there are generally no engineering resources available to debug the neural network processor in production. Accordingly, rebooting the neural network processor to eliminate the hanging condition may be a preferred response to the timeout error in production.

Some examples of processors, such as neural network processors 120, 220, and/or 400, may include non-transient, tangible, machine readable media that include executable code that when run by one or more processors (e.g., processors 120, 220, and/or 400) may cause the one or more processors to perform the processes of method 500. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A neural network processor for executing a plurality of neural networks associated with use of a vehicle, the neural network processor comprising: a plurality of error detectors configured to detect respective errors associated with execution of the neural networks; and a neural network controller configured to receive information from the error detectors and modify operation of the neural network processor based on the received information, wherein the neural network controller maintains one or more status registers for each neural network included in at least a subset of the plurality of neural networks.

2. The neural network processor of claim 1, wherein the neural network processor comprises an interface, the interface being configured to communicate with external resources, and wherein a subset of the error detectors are associated with the interface and configured to detect errors associated with communications with the external resources.

3. The neural network processor of claim 2, wherein a particular error detector of the subset of the error detectors is a response error detector which is configured to detect an error associated with a response packet received via the interface.

4. The neural network processor of claim 2, wherein a particular error detector of the subset of the error detectors is an integrity error detector which is configured to detect an error associated with corruption of information received via the interface.

5. The neural network processor of claim 2, wherein a particular error detector of the subset of the error detectors is a protocol error detector which is configured to detect an error associated with a communication protocol implemented by the interface.

6. The neural network processor of claim 1, wherein the neural network processor comprises local memory, and wherein a subset of the error detectors are associated with the local memory.

7. The neural network processor of claim 6, wherein a particular error detector of the subset of the error detectors is a parity error detector which is configured to verify integrity of data stored in the local memory.

8. The neural network processor of claim 6, wherein a particular error detector of the subset of the error detectors is an instruction error detector which is configured to verify instructions stored in the local memory.

9. The neural network processor of claim 1, wherein the neural network processor comprises a compute engine configured to execute instructions to compute a result of a particular neural network based on input data, and wherein a computational error detector is associated with the compute engine and configured to detect errors associated with invalid operations.

10. The neural network processor of claim 1, wherein a particular error detector of the error detectors is a timeout error detector which is configured to monitor idle cycles associated with different aspects of execution of the neural network processor, wherein the timeout error detector monitors respective elapsed times associated with the idle cycles.

11. The neural network processor of claim 1, wherein the information received from the error detectors is received via one or more reports using machine check architecture.

12. The neural network processor of claim 1, wherein the neural network controller determines a type of error of a plurality of types of errors based on the received information, and wherein the types of errors include a data error, a program error, and a timeout error.

13. The neural network processor of claim 12, wherein based on the determined type of error being a data error, the neural network controller causes a pending computation of a particular neural network to be indicated as being tainted, wherein a result of the pending computation is ignored by the neural network processor.

14. The neural network processor of claim 12, wherein based on the determined type of error being a program error, the neural network controller causes a reboot of a particular neural network.

15. The neural network processor of claim 12, wherein based on the determined type of error being a computational error, the neural network controller causes transition of a particular neural network to a debug state or causes termination of execution of the neural network.

16. The neural network processor of claim 1, wherein to modify operation of the neural network processor, the controller is further configured to:
perform one or more remedial actions comprising (1) retrying execution of a particular neural network, (2) executing the particular neural network with respect to subsequent input data, or (3) rebooting the neural network processor.

17. A vehicle comprising: one or more sensors positioned about the vehicle, the sensors collecting information reflective of a real-world environment surrounding the vehicle; and a neural network processor for executing a plurality of neural networks associated with autonomous operation of the vehicle, the neural network analyzing at least a portion of the collected information, and the neural network processor comprising: a plurality of error detectors configured to detect respective errors associated with execution of the neural networks; and a neural network controller configured to receive information from the error detectors and modify operation of the neural network processor based on the received information, wherein the neural network controller maintains one or more status registers for each neural network which are included in at least a subset of the plurality of neural networks.

18. The vehicle of claim 17, wherein to modify operation of the neural network processor, the controller is further configured to:
perform one or more remedial actions comprising (1) retrying execution of a particular neural network, (2) executing the particular neural network with respect to subsequent input data, or (3) rebooting the neural network processor.

19. The vehicle of claim 17, wherein the neural network controller determines a type of error of a plurality of types of errors based on the received information, and wherein the types of errors include a data error, a program error, and a timeout error.

20. A method implemented by a neural network processor executing a plurality of neural networks during operation of a vehicle, the neural network analyzing information obtained from one or more sensors located about the vehicle for use in autonomous operation of the vehicle, and the method comprising, obtaining, via a plurality of error detectors configured to detect respective errors associated with execution of the neural networks, information associated with execution of the neural network processor; and modifying operation, via a neural network controller configured to receive information from the error detectors, operation of the neural network processor based on the received information, wherein the neural network controller maintains one or more status registers for each neural network included in at least a subset of the plurality of neural networks.

* * * * *